United States Patent Office 2,854,457
Patented Sept. 30, 1958

2,854,457
PROCESS OF PREPARING DIPYRIDYLS

Francis E. Cislak, Indianapolis, Ind., assignor to Reilly Tar & Chemical Corporation, Indianapolis, Ind., a corporation of Indiana No Drawing. Application May 20, 1957
Serial No. 660,090

5 Claims. (Cl. 260—296)

This invention relates to a process of preparing dipyridyls. More particularly, it relates to a process of preparing 2'-dipyridyls by the interaction of acetaldehyde or acetylene with an aminomethylpyridine. The equation below depicts the formation of 2,2'-dipyridyl by the interaction of 2-aminomethylpyridine and acetylene.

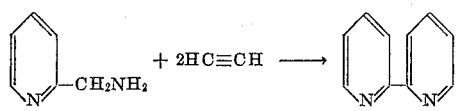

The prior art shows several reactions for the synthesis of dipyridyls. However, none of the heretofore known methods give yields which make the processes commercially feasible. The prior art processes are characterized by giving a mixture of dipyridyls, tripyridyls, resinous products, etc. from which it is difficult to isolate a specific dipyridyl in commercial amounts.

I have found that I can prepare 2'-dipyridyls economically and in good yields by the interaction of acetaldehyde or acetylene and aminomethylpyridine.

In carrying out my invention, I prepare a gaseous mixture of aminomethylpyridine and acetaldehyde or acetylene and pass the mixture through a suitable reactor containing a catalyst. The temperature of the reactor is maintained between about 400° C. and 550° C. and preferably between about 450° C. and 500° C. I prefer to conduct my process in a continuous manner although that is not necessary.

The reactor used may be of various types. I prefer the fluid catalyst type, similar to those normally used in carrying out cracking operations in the petroleum industry. Such reactors are of tubular form with suitable connections at entrance and exit. They are provided with means for supporting the fluid bed of catalyst, and are provided with any convenient means for heating them.

The catalyst used may be any of a large number of catalysts which are useful in the preparation of 2-picoline and 4-picoline from acetylene and ammonia.

Illustrative of the manner in which my invention may be carried out, I cite the following examples. The parts are by weight.

Example 1

To 162 parts of 2-aminomethylpyridine I add 88 parts of acetaldehyde. The resulting solution is vaporized and I pass the mixture of vapors through a fluid catalyst type reactor containing a fluidized catalytic bed of silica-alumina catalyst (13% alumina). The temperature of the reactor is maintained at about 450° C. As the vapors of 2-aminomethylpyridine and acetaldehyde pass through the reactor, a reaction occurs whereby 2,2'-dipyridyl is formed. The vapors of the unchanged reactants and the reaction products are condensed as they emerge from the reactor, and the condensate is collected in a suitable receiver. The condensate as recovered contains an appreciable amount of water. This water may be removed by the addition of flake caustic soda. The resulting dry crude bases are fractionally distilled through an efficient fractionation column. The 2,2'-dipyridyl is collected in the fraction distilling at 267–275° C.

Example 2

The process of Example 1 is repeated with the exception that 3-aminomethylpyridine is used in place of the 2-aminomethylpyridine and 3,2'-dipyridyl is formed.

Example 3

The process of Example 1 is repeated with the exception that 4-aminomethylpyridine is used in place of the 2-aminomethylpyridine and 4,2'-dipyridyl is formed.

In place of the silica-alumina catalyst I may use a large number of other catalysts. In general I find that among the catalysts useful in carrying out my reaction are those catalysts which have been found useful in the preparation of 2-picoline and 4-picoline from acetylene (or acetaldehyde) and ammonia. Such catalysts include, in addition to the silica-alumina catalyst of Example 1, alumina, silica, silica-magnesia, fuller's earth, pumice, zinc chloride, zinc fluoride, cadmium chromate, cadmium fluoride, zinc phosphate, and the like.

My invention does not reside in the discovery of a new catalyst. What I have discovered is that the interaction of aminomethylpyridine and acetaldehyde yields dipyridyl in good yields.

In Example 1 the molecular equivalents of the reactants used are acetaldehyde, 2 mols, 2-aminomethylpyridine, 1½ mols. I need not, however, use the specific molal ratios of Example 1. The proportions of the reactants may vary widely. In general I prefer to use an excess of 2-aminomethylpyridine although that is not necessary.

The temperature at which my reaction may be conducted may be varied widely. In general I prefer to have the reaction temperatures above about 400° C. and below about 550° C. It has been my experience that at temperatures below about 400° C., too large a proportion of the reactants pass through without reacting. At temperatures above about 550° C., I find my catalyst becomes inactivated rapidly and I obtain too many side reactions.

In place of the acetaldehyde used in Example 1, I may use acetylene.

I claim as my invention:

1. The process of preparing dipyridyls which comprises mixing the vapors of an aminomethylpyridine and those of a compound of the class consisting of acetaldehyde and acetylene, passing the resultant mixture through a reactor containing a catalyst useful in the preparation of picolines from acetylene and ammonia, maintained at an elevated temperature and recovering dipyridyl from the reaction product.

2. The process of preparing 2,2'-dipyridyl which comprises preparing a gaseous mixture of 2-aminomethylpyridine and acetaldehyde, passing the gaseous mixture through a reactor containing a catalyst useful in the preparation of picolines from acetylene and ammonia, maintained at a temperature between about 450° C. to about 500° C. and recovering 2,2'-dipyridyl from the reaction product.

3. The process of claim 2 in which the catalyst is silica-alumina.

4. The process of claim 1 in which the aminomethylpyridine is 3-aminomethylpyridine, the reactor temperature is between about 450° C. and 500° C., and 3,2'-dipyridyl is recovered from the reaction product.

5. The process of claim 1 in which the aminomethylpyridine is 4-aminomethylpyridine, the reactor temperature is between about 450° C. and 500° C., and 4,2'-dipyridyl is recovered from the reaction product.

References Cited in the file of this patent

UNITED STATES PATENTS

| | | |
|---|---|---|
| 2,520,097 | Hearne | Aug. 22, 1950 |
| 2,523,580 | Mahan | Sept. 26, 1950 |